(12) United States Patent
Franke (10) Patent No.: US 8,474,588 B2
(45) Date of Patent: Jul. 2, 2013

(54) DRY CLUTCH HAVING SOLID LUBRICANT FRICTION STABILIZATION INSERTS

(75) Inventor: Brian William Franke, Hamilton, IN (US)

(73) Assignee: Eaton Corporation, Cleveland, OH (US)

( * ) Notice: Subject to any disclaimer, the term of this patent is extended or adjusted under 35 U.S.C. 154(b) by 357 days.

(21) Appl. No.: 12/807,971

(22) Filed: Sep. 17, 2010

(65) Prior Publication Data

US 2011/0259701 A1   Oct. 27, 2011

Related U.S. Application Data

(60) Provisional application No. 61/326,376, filed on Apr. 21, 2010.

(51) Int. Cl.
*F16D 13/70* (2006.01)
*F16D 13/74* (2006.01)

(52) U.S. Cl.
USPC ............ 192/70.3; 192/89.26; 192/99 A; 192/110 B (58) Field of Classification Search
USPC ............ 192/70.29, 70.3, 99 A, 89.24, 89.26; 74/570.3
See application file for complete search history.

(56) References Cited

U.S. PATENT DOCUMENTS

| | | | | |
|---|---|---|---|---|
| 4,034,836 A | * | 7/1977 | Sink et al. | 192/99 A |
| 4,760,906 A | | 8/1988 | Flotow et al. | |
| 5,531,308 A | | 7/1996 | Gochenour et al. | |
| 5,564,542 A | * | 10/1996 | Gochenour et al. | 192/89.24 |
| 5,593,015 A | * | 1/1997 | Kosumi et al. | 192/70.3 |
| 5,641,048 A | | 6/1997 | von Gaisberg | |
| 5,727,666 A | | 3/1998 | Maucher | |
| 6,446,778 B1 | | 9/2002 | Cole et al. | |
| 6,698,564 B2 | | 3/2004 | Kummer et al. | |

* cited by examiner

*Primary Examiner* — Rodney Bonck
(74) *Attorney, Agent, or Firm* — Warn Partners, P.C.

(57) ABSTRACT

The present invention provides a lever actuator rear pull dry clutch to connect an engine with a vehicle transmission. A spring retainer and/or pressure plate of the clutch assembly has a dry lubricant for sliding in pivotal engagement with the levers to maintain the efficiency of the actuation of the clutch over an extended life cycle of the clutch assembly.

20 Claims, 8 Drawing Sheets

DRY CLUTCH HAVING SOLID LUBRICANT FRICTION STABILIZATION INSERTS

CROSS-REFERENCE TO RELATED APPLICATIONS

This application claims the benefit of U.S. Provisional Application No. 61/326,376, filed Apr. 21, 2010.

FIELD OF THE INVENTION

The present invention relates to dry clutch assemblies connecting an engine flywheel with an input shaft of a truck transmission, particularly dry clutch assemblies which utilize a pull back type release bearing assembly to release the clutch.

BACKGROUND OF THE INVENTION

Pull back release bearing dry friction clutches are typically provided in two main embodiments. A first embodiment, which is typically less expensive, is a diaphragm spring actuated clutch assembly. When higher levels of performance are desired, a lever actuated dry friction clutch is often specified. The lever actuated dry friction clutch typically has a cover which is torsionally affixed with respect to the vehicle's engine flywheel. Torsionally affixed with respect to the cover is an axially moveable pressure plate. Movement of the pressure plate towards the flywheel causes axial engagement of the pressure plate with a friction disc or discs. The friction disc or discs are torsionally affixed with an input shaft of the vehicle's transmission. Accordingly, selective engagement of the vehicle's engine with the transmission of the vehicle is achieved by movement of the pressure plate towards the flywheel to engage the clutch or away from the flywheel to release the clutch. To urge the pressure plate towards the flywheel, there is typically provided a plurality of geometrically spaced actuating levers. The actuating levers at their outer radial ends have a pivotal engagement with respect to the clutch assembly's cover. The levers are typically bent in such a manner that they have a pivotal sliding contact with surfaces of the pressure plate radially inward their pivotal connection with respect to the cover. The inner-most radial ends of the actuating levers commonly have pivotal and sliding engagement with a peripheral groove or shoulder or notch provided in a spring retainer assembly. The spring retainer assembly is slideably positioned on the vehicle's transmission input shaft. A plurality of actuating coil springs are utilized to axially bias the position of the spring retainer upon the transmission input shaft and thereby urge the radial inner end of the levers to an axial position wherein the levers pivotal contact with the pressure plate cause the pressure plate to engage the friction disc. To release the vehicle transmission from the vehicle engine, a release assembly is provided. The release assembly allows a non-rotational pull assembly to be displaced on the rotating transmission shaft. An operator-actuated or automatically actuated yoke can pull back upon the pull assembly away from the flywheel and pull back the spring retainer against the force of the actuating coil springs thereby causing the actuating levers to pivot in such a manner that the pressure plate is released from engagement from the friction disc(s). The actuating levers typically have metal-to-metal contact with the aforementioned spring retainer and with the pressure plate assembly. This combination of sliding and pivotal metal-to-metal engagement with the spring retainer and with the pressure plate is a source friction generation resulting in efficiency losses in the operation of the clutch assembly. It is desirable to provide a lever actuated dry friction clutch assembly wherein efficiency losses due to frictional engagement may be reduced.

SUMMARY OF THE INVENTION

To make manifest the above noted and other manifold desires, a revelation of the present invention is brought forth. In a preferred embodiment, the present invention brings forth a selectively engageable dry friction clutch assembly for connecting a transmission with the flywheel of an engine. A cover is provided having a main body axially spaced from the flywheel and being torsionally connected thereto. An axially moveable pressure plate is provided which is torsionally connected with the cover. A friction disc for having torsional connection with an input shaft of the transmission is provided. The friction disc is axially positioned between the flywheel and the pressure plate. A release assembly is provided which includes a spring retainer biased by coil springs for urging the pressure plate towards the flywheel. The coil springs which urge the pressure plate towards the flywheel are captured between the spring retainer and the cover. A plurality of levers is provided. The levers have a radially inner first sliding pivotal engagement with the spring retainer and an intermediate second sliding pivotal engagement with the pressure plate. Additionally, the levers have a third pivotal engagement with respect to the cover. At least one of the first or second sliding pivotal engagements of the levers is on an engagement surface provided by a polymeric member mounted on the spring retainer or on the pressure plate respectively.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Referring to FIGS. 1-3B, a selectively engageable dry friction lever applied reverse pull clutch assembly 7 of the present invention has a cover 10. The cover 10 has a main body 12 and a rim 14. The cover 10 is torsionally connected by a series of threaded fasteners (not shown) with an engine flywheel 18 thereby torsionally connecting the cover 10 with the flywheel 18. The flywheel 18 is torsionally connected to an output shaft (not shown) of the truck engine. The cover rim 14 allows the cover main body 12 to be axially spaced from the flywheel 18.

Clutch assembly 7 as illustrated incorporates an optional adjustment mechanism. The cover 10 has affixed thereto a spring loaded cable 22. The spring loaded cable 22 torsionally loads a rear cam ring 24. Cam ring 24 attempts to rotate with respect to a front cam ring 26 causing inclined surfaces 28, 30 to relatively rotate with one another pushing surface 32 away from the main body 12 of the cover in order to compensate for clutch wear. Surface 32 abuts an adjusting ring 34. Adjusting ring 34 has a plurality of geometrically spaced pivot extensions 36. A more detailed explanation of the adjustment capabilities provided by the optional adjustment mechanism of the clutch assembly 7 can be gained from a review of commonly assigned U.S. Pat. No. 5,531,308.

The cover main body 12 receives several pins 38 which are part of the optional adjustment mechanism. The pins 38 project into apertures 40 of an annular shaped pressure plate 42. The pins 38 may be used to connect straps 39 to pressure plate 42, which are in turn connected with the cover 10. The pins 38 and straps 39 provide the torsional connection of the pressure plate with the cover 10 and allow the pressure plate 42 to be axially moveable. Straps 35 are provided to torsionally connect the adjustment plate 34 with the pressure plate 42.

Figure 3A:
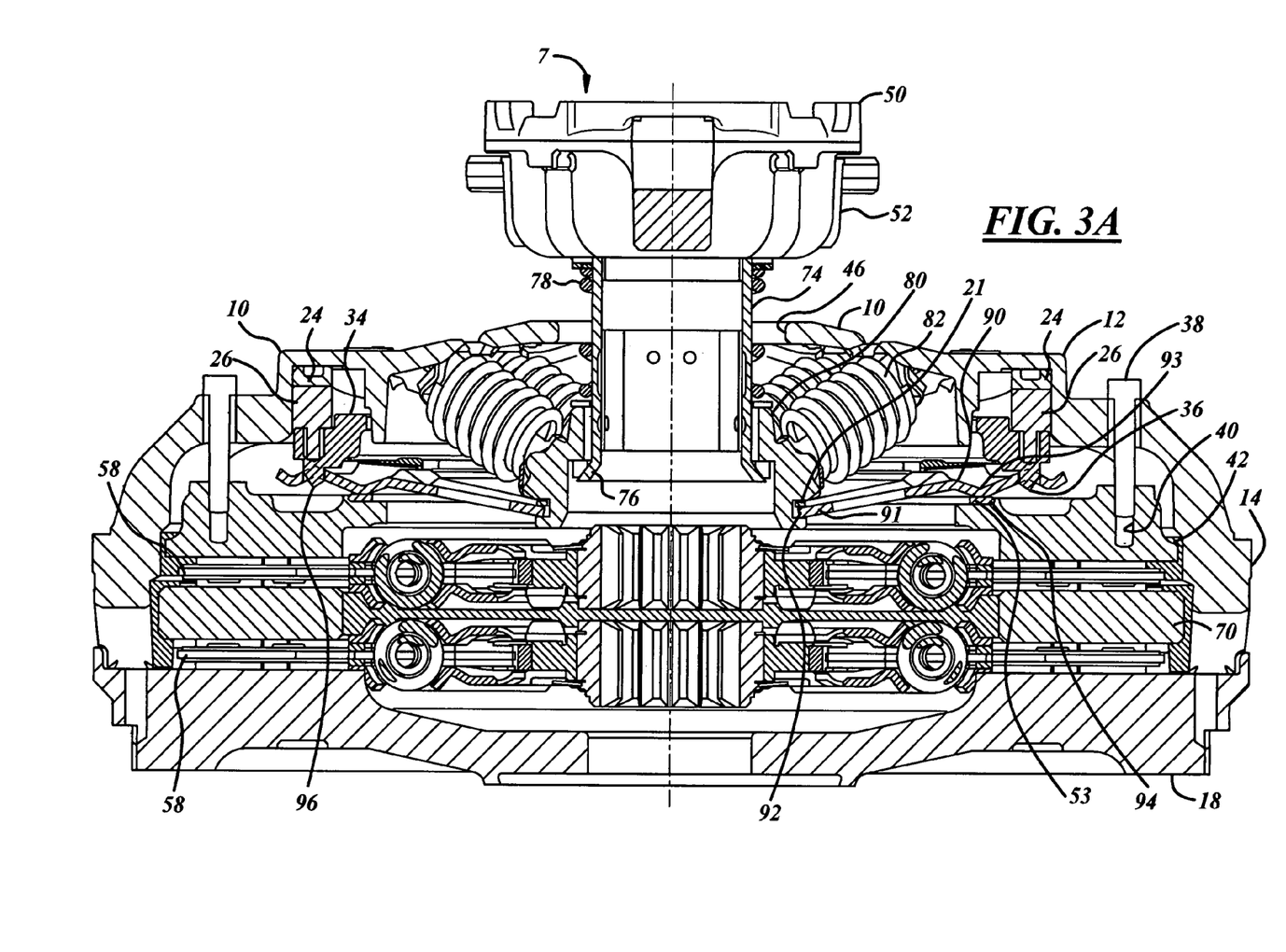
FIG. 3A is a sectional view of the clutch assembly shown in FIG. 1 showing the clutch assembly in the engaged position.
Figure 3B:
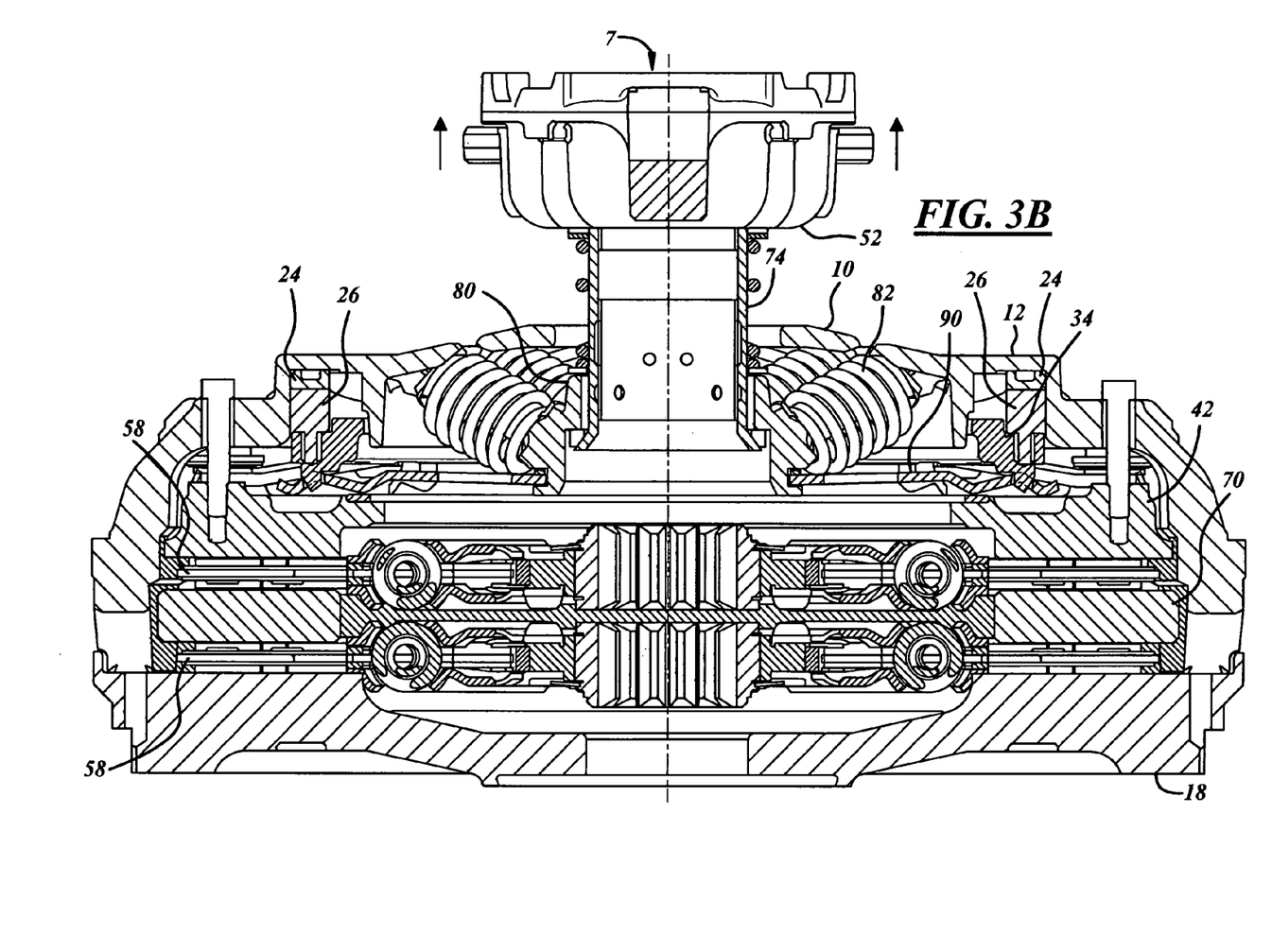
FIG. 3B is a sectional view similar to FIG. 3A showing the clutch assembly in a released position.

The cover 10 has an aperture 46 (FIG. 3A). Extending through the aperture 46 is a release assembly 50. The release assembly 50 includes a pull assembly 52. The pull assembly 52 provides a structure to allow a shift yoke (not shown) to grab the release assembly 50 and pull it in a direction away from the pressure plate 42. The release assembly pull assembly 52 has mounted inside a bearing (not shown). The bearing allows the pull assembly 52 to be rotatively fixed with respect to a clutch housing (not shown) connecting an engine block to a transmission housing (not shown). An outer race of the bearing is rotatively fixed to an outer housing or portion of release assembly 50 engaged by the shift yoke. An inner race of the bearing is rotatively fixed to a rotating sleeve 74. When the clutch assembly is installed in the vehicle, sleeve 74 is disposed over an independently rotating transmission input shaft (not shown).

The transmission input shaft is torsionally connected with at least one friction disc 58. Each friction disc 58 has a splined inner hub 60 which allows the friction disc to be axially moveable while at the same time having a torsional connection with the transmission input shaft (not shown). The splined connection of the friction disc has a spring dampening arrangement 62 with an outer portion 64 of the disc to allow for the absorption of torque spikes due to the reciprocating piston nature of the truck engine. The outer portion of the friction disc 64 has a plurality of friction pads 66 on both its front and rear axial facing.

Juxtaposing the friction discs 58 is an optional intermediate plate 70 enabling the use of an optional second friction disc 58. The intermediate plate 70 has a series of lugs 72 which project into slots 73 provided in the cover 10 causing torsional connection of intermediate plate to the cover 10 while still allowing the intermediate plate to be axially moveable with respect to the flywheel 18 and the cover 10.

Referring back to the release assembly 50, the pull assembly 52 has connected thereto the sleeve 74. The sleeve 74 has a flared portion 76. Encircling the sleeve 74 is a coil spring 78. The coil spring 78 spring loads and allows for axial sliding movement between the pull assembly 52 and another portion of the release assembly referred to as the spring retainer 80.

The spring retainer 80 mounts six (only four shown) actuator coil springs 82 that are captured between the cover main portion 12 and the spring retainer 80. The actions of the springs 82 urge the spring retainer 80 in a direction towards the pressure plate 42. The spring retainer 80 also mounts three geometrically spaced springs 86 to provide assistance in releasing the clutch in a manner described in more detail in commonly assigned U.S. Pat. No. 4,760,906.

To transmit motion from the release assembly 50 to the pressure plate 42, there is provided at least three, and in most instances five or six apply levers 90. The apply levers 90 have a radial inner end 91 having a radially inner first sliding pivotal engagement 92 with the spring retainer 80. Each lever 90 also has a bend portion 93 with intermediate second sliding pivotal engagement 94 with the pressure plate 42. Additionally, each lever has a slot 95 that is penetrated by the pivot extension 36 to provide the lever with a third pivotal engagement 96 with respect to the cover 10 (via the adjusting plate 34). To selectively torsionally connect the engine of the vehicle with the input shaft of the transmission, the coil springs 82 bias the spring retainer 80 towards the pressure plate 42 causing the levers 90 to have their radial inner end 91 to be pushed towards the pressure plate 42 causing the bend portion 93 of the levers to push the pressure plate 42 towards the flywheel 18 as the levers pivot about adjacent their outer radial end in the pivot extension 36. The above noted action moves the pressure plate 42, causing the friction discs 58 to be captured with the flywheel 18, pressure plate 42 and intermediate plate 70. The capture of the friction discs 58 with the flywheel 18 and pressure plate 42 and intermediate plate 70 causes the torque output of the engine output shaft (not shown) to be transferred to the transmission input shaft (not shown). To allow for transmission gear shift changes, the clutch assembly 7 is released by the yoke (not shown) pulling back on the pull assembly 52 causing the sleeve flared portion 76 to engage with the spring retainer 80 pulling back the inner most radial ends 91 of the levers 90 and thereby relieving the bend portion 93 of the levers from the pressure plate 42, thereby allowing the friction discs 58 to be released from the pressure plate 42, intermediate plate 70, and flywheel 18. As mentioned previously, clutch assembly 7 is in a dry (non-liquid lubricating oil) environment and operation of the clutch 7 in normal utilization generates large amounts of heat wherein the only cooling available is that achieved through the clutch assembly 7 spinning through the air. The efficiency of the clutch is largely dependent upon the operation of the levers 90. Friction generated from the sliding pivotal engagement of the lever inner most radial end 91 of the levers with the spring retainer 80 and with the bend 93 of the levers with the pressure plate 42 can affect the efficiency of the clutch. To lower the friction from the sliding pivotal engagement of the levers 90, the spring retainer 80 engagement 92, and/or the friction plate 42 engagement 94 can be provided with solid lubricant friction stabilizing polymeric members as to be described.

Figure 1:
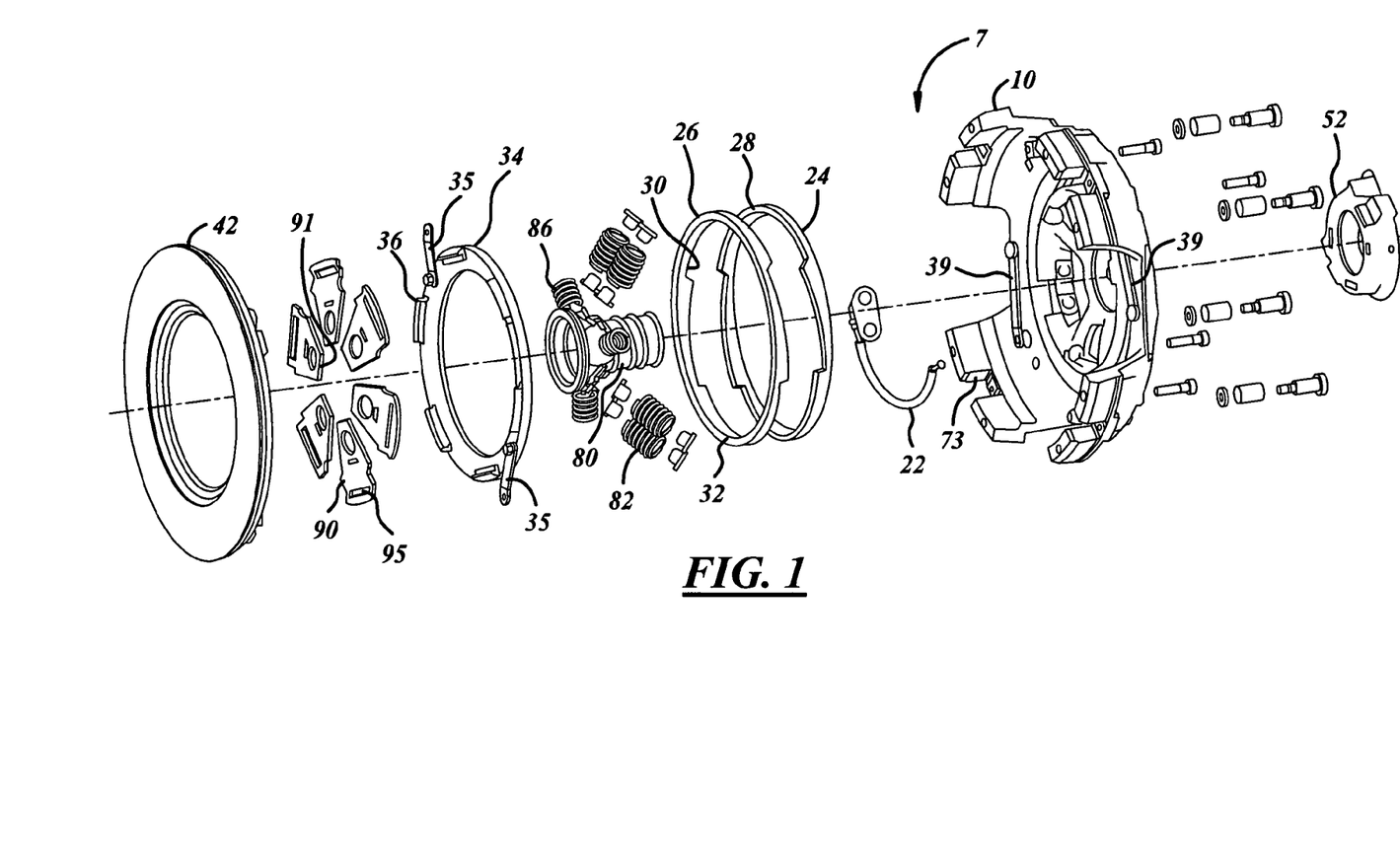
FIG. 1 is an exploded view of a rear portion of a preferred embodiment reverse pull dry clutch assembly according to the present invention.
Figure 2:
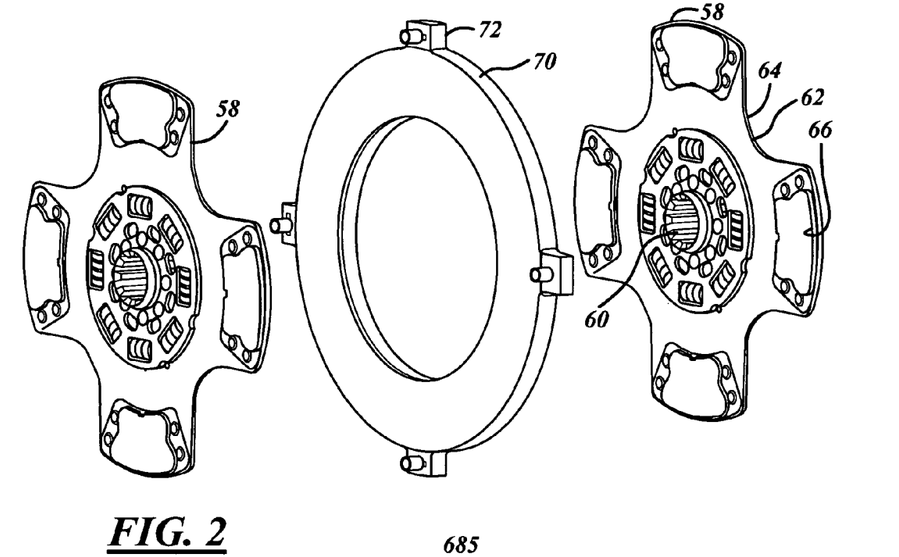
FIG. 2 is an exploded view of a front portion of the clutch assembly shown in FIG. 1.

Polymeric member 21 provides a first inner radial sliding and pivotal engagement 92 surface for the inner extreme radial end 91 of the lever 90. The polymeric member can be of several suitable high temperature plastics including PEEK™ (Polyetherether Ketone) or Vespel plastic (polyimide-based polymer). A typical material utilized is Victrex® PEEK™ 450G having high properties of creep resistance and heat aging resistance. Typical properties are:

| Mechanical Data | Conditions | Test Method | Units | Typical Value |
|---|---|---|---|---|
| Tensile Strength | Yield 23° C. | ISO 527 | MPa | 100 |
| Flexural Strength | 23° C. | ISO 178 | MPa | 165 |
| Compressive Strength | 23° C. | ISO 604 | MPa | 120 |
| Charpy Impact Strength | Notched, 23° C. | ISO 179/1eA | kJ m$^{-2}$ | 7.0 |
| Izod Impact Strength | Notched, 23° C. | ISO 180/A | kJ m$^{-2}$ | 7.5 |

| Thermal Data | Conditions | Units | Typical Value |
|---|---|---|---|
| Continuous Use Temperature | Mechanical without impact | ° C. | 240 |
| | Mechanical with impact | ° C. | 180 |

| Miscellaneous | Conditions | Test Method | Units | Typical Value |
|---|---|---|---|---|
| Density | Crystalline | ISO 1183 | g cm$^{-3}$ | 1.30 |
| Density | Amorphous | ISO 1138 | g cm$^{-3}$ | 1.26 |
| Shore D hardness | 23° C. | ISO 868 | | 87 |

The pressure plate 42 has a polymeric member 53. The polymeric member 53 provides a second intermediate sliding pivotal engagement surface 94 for the bend 93 of the levers 90.

Typically the material for polymeric member 53 is the same as that described for polymeric member 21. With utilization of spring retainer polymeric member 21 and pressure plate polymeric member 53, the force efficiency for actuation of clutch assembly 7 stabilized over the life of the clutch assembly.

Figure 4:
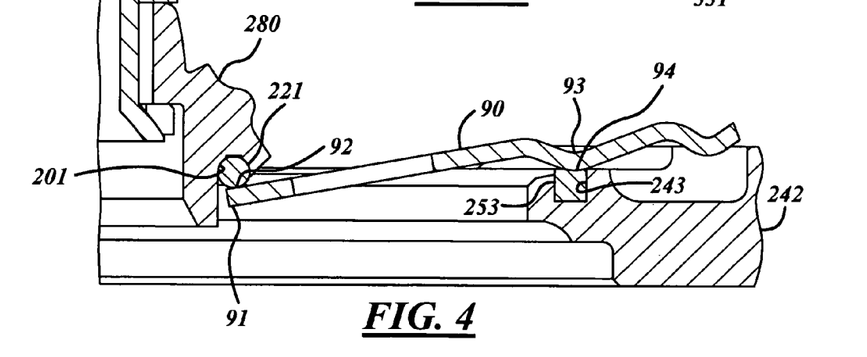
FIG. 4 is a partial enlarged sectional view of an alternate preferred embodiment clutch assembly according to the present invention illustrating portions of a spring retainer, pressure plate and lever.
Figure 5:
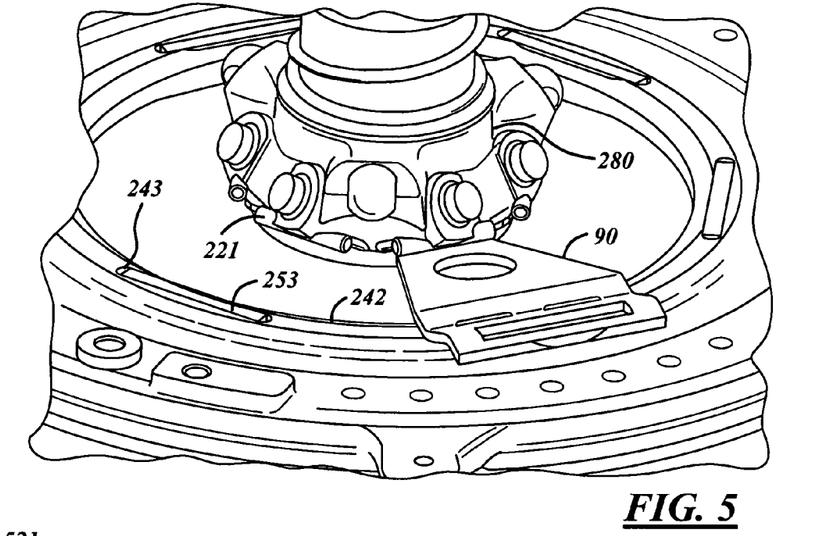
FIG. 5 is a perspective view of a spring retainer and pressure plate and lever of the clutch assembly shown in FIG. 4.

Referring to FIGS. 4 and 5, a spring retainer 280 substantially similar to prior described retainer 80 is provided. Spring retainer 280 along its lower end has six geometrically spaced tangential slots 201. Polymeric members 221 provides a first inner radial sliding and pivotal engagement 92 surface for the extreme radial ends 91 of the levers 90. A pressure plate 242 is provided that is substantially similar to the pressure plate 42 illustrated in FIGS. 1, 3A and 3B. Pressure plate 242 has six geometrically spaced elongated slots 243. Press fitted within the slots 243 are polymeric members 253. Polymeric members 253, corresponding to the number of levers 90, provide second intermediate sliding pivotal engagement surfaces 94 for the bend 93 of the levers 90. The material for polymeric member 221 and 253 is the same as that described for polymeric member 21.

Figures 6, 9:
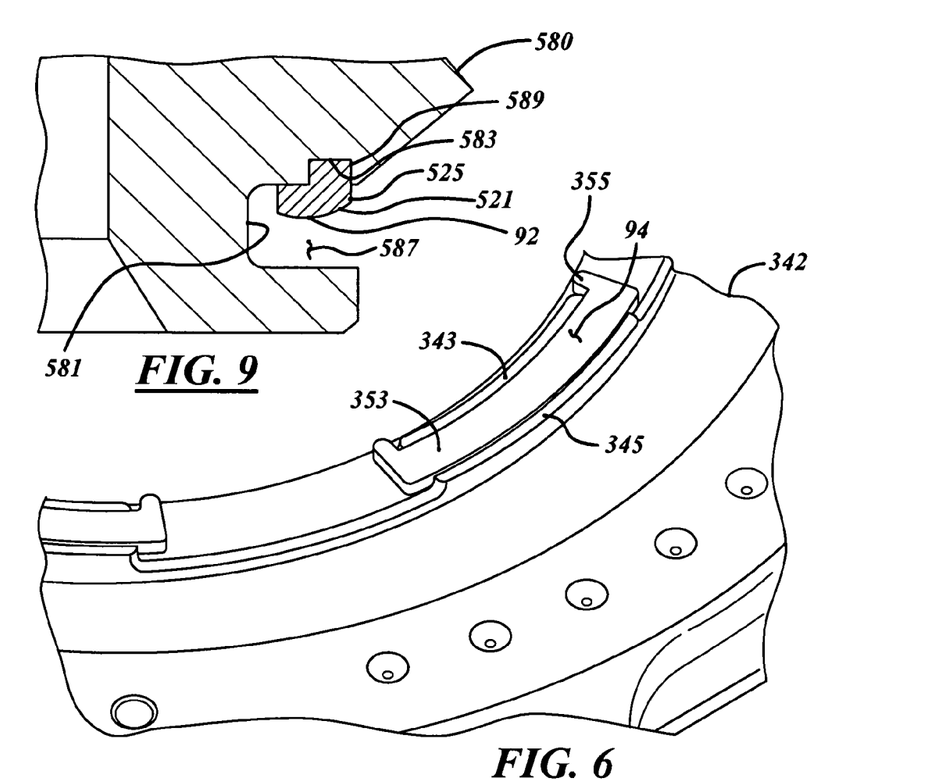
FIG. 6 is an enlarged partial perspective view of a pressure plate of another alternative embodiment clutch assembly of the present invention.
FIG. 9 is an enlarged sectional view of a spring retainer utilizing the spring retainer polymeric member shown in FIG. 8.

Referring to FIG. 6, an alternate embodiment pressure plate polymeric member 353 is press fitted to pressure plate 342. Pressure plate 342 has two actuate generally parallel spaced ridges 343, 345 that allow the polymeric member 353 to be press fit within. Polymeric member 353 has ears 355 to prevent arcuate movement of the polymeric member 353. In a manner as previously described, polymeric member 353 provides a second radially intermediate sliding pivotal engagement surface 94 for a lever 90.

Figure 7:
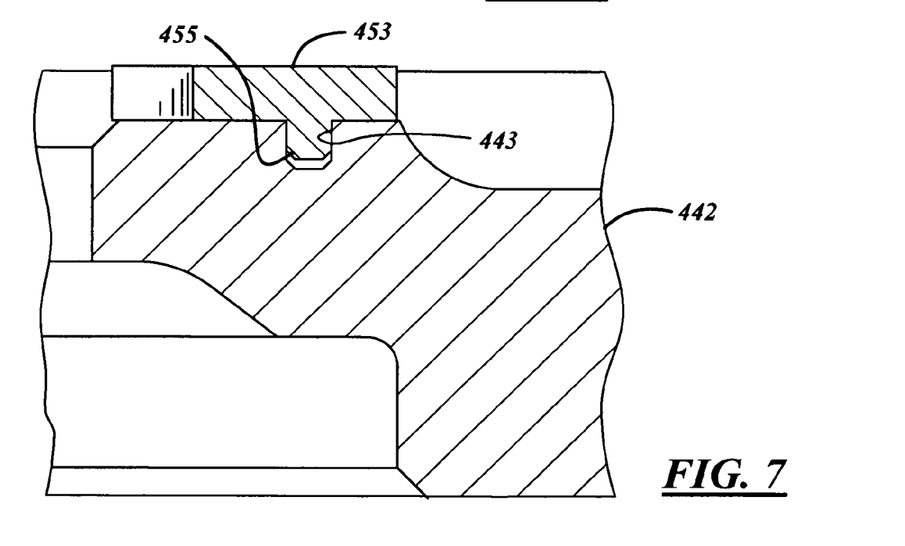
FIG. 7 is an enlarged sectional view of a pressure plate of yet another alternate preferred embodiment clutch assembly of the present invention.

FIG. 7 provides an alternate preferred embodiment pressure plate polymeric member 453. Polymeric member 453 is an annular ring. The annular ring has a generally perpendicular projecting ear 455 that is press fit within a corresponding annular groove 443 provided in the pressure plate 442. Again, the material of the polymeric member 453 is substantially identical to that previously described for polymeric member 253. An advantage of the arrangement for the polymeric member 453 is that it is one single piece rather than a separate piece for each respective lever 90.

Figure 8:
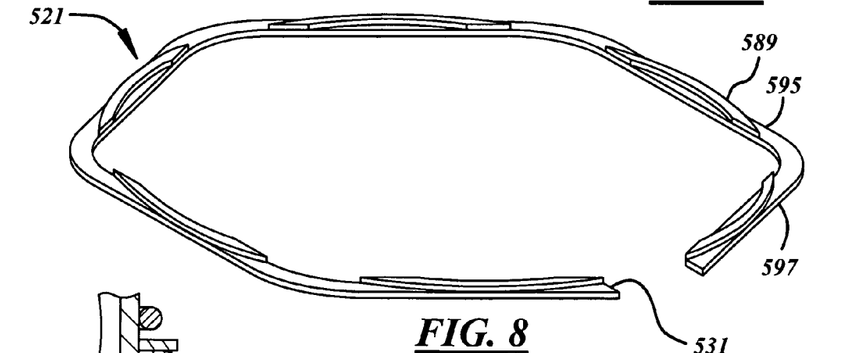
FIG. 8 is a perspective view of a spring retainer polymeric member in another alternative embodiment clutch assembly of the present invention.
Figure 10:
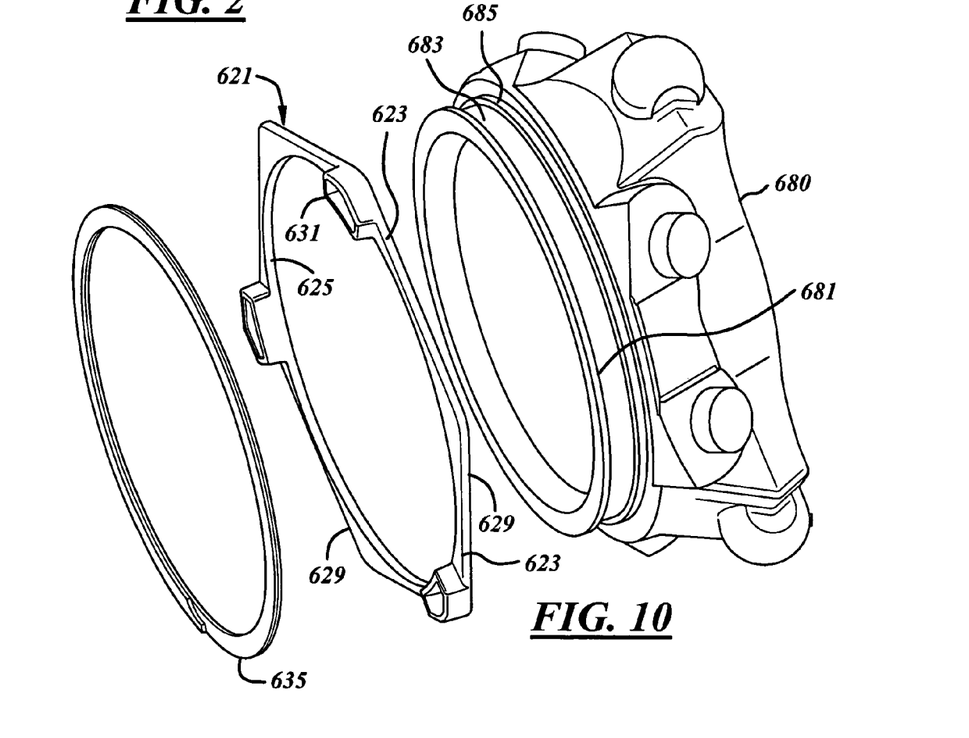
FIG. 10 is an exploded view of a spring retainer and spring retainer polymeric member and snap ring of another alternate preferred embodiment clutch assembly of the present invention.
Figure 11:
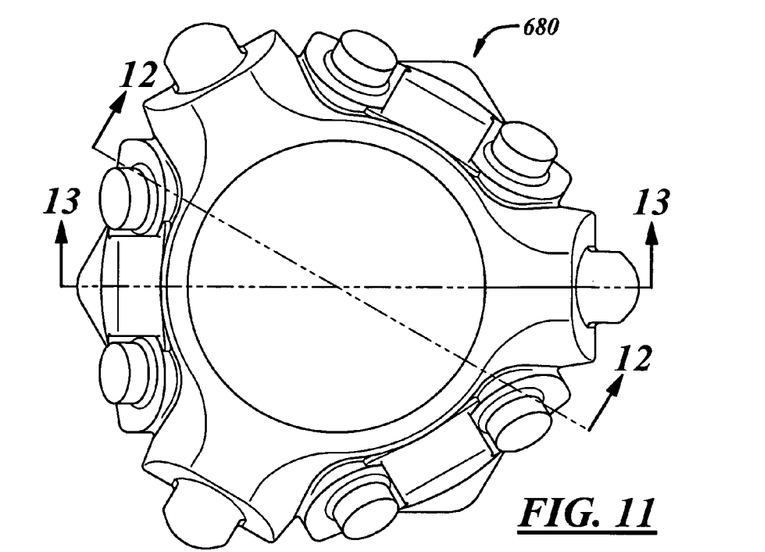
FIG. 11 is a top plan view of the spring retainer shown in FIG. 10.
Figure 12:
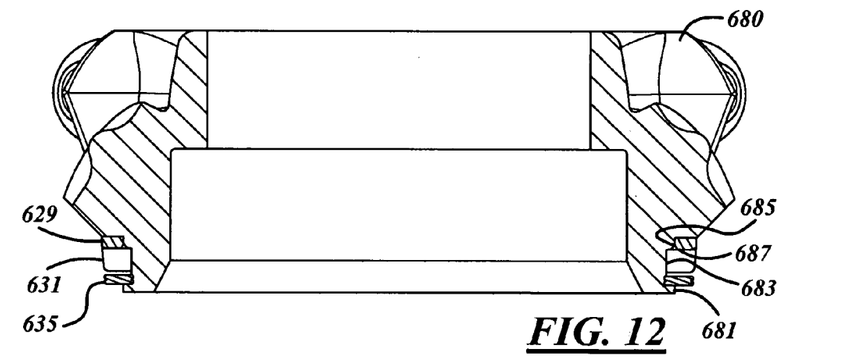
FIG. 12 is a sectional view of the spring retainer shown in FIG. 11 in the direction of arrows 12-12 of FIG. 11.
Figure 13:
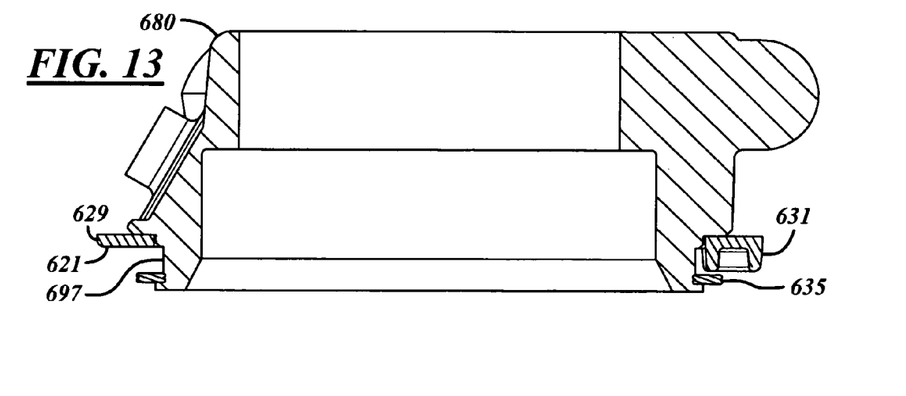
FIG. 13 is a sectional view of the spring retainer shown in FIG. 11 in the direction of arrows 13-13.
Figure 14:
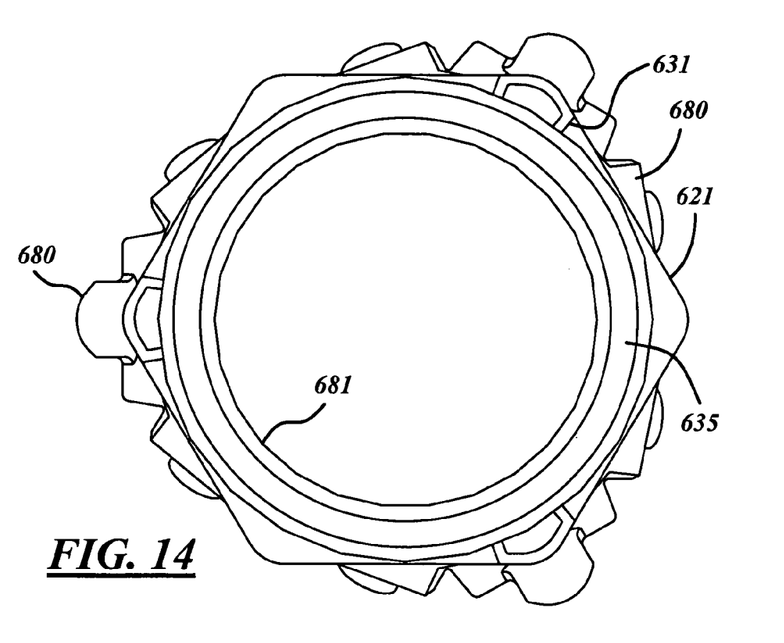
FIG. 14 is a bottom plan view of the spring retainer shown in FIG. 10 with the polymeric member and snap ring assembled thereto.
Figure 15:
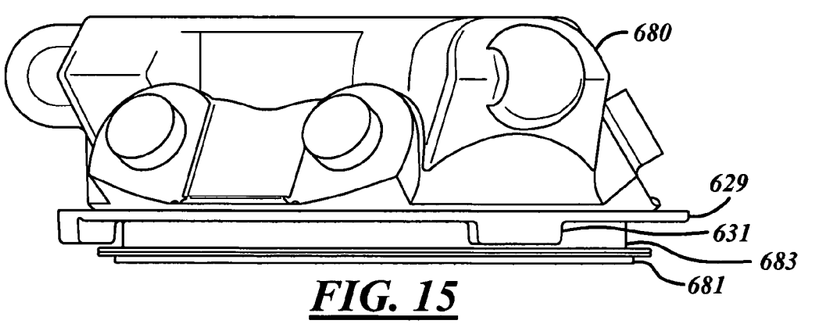
FIG. 15 is a side elevational view of the spring retainer shown in FIG. 14.

Referring to FIGS. 8 and 9, a spring retainer 580 substantially similar to spring retainer 80 is provided. Spring retainer 580 adjacent its lower end has peripheral groove 581. Fitted within peripheral groove 581 is a generally annular shaped spring retainer polymeric member 521. Polymeric member 521 has a generally segmented circular upper ear 589 that is fitted within a perpendicular subgroove 583 of the spring retainer 580. The spring retainer polymeric member 521 is made of the same material as previously described for polymeric member 221. A main body portion 595 provides a first inner sliding pivotal engagement surface with the levers. The spring retainer polymeric member 521 has integral generally polygonal peripheral surfaces 597. The number of polygonal surfaces 597 (six) matches the number of levers 90. The generally polygonal shape provided by the spring retainer polymeric member 521 presents a greater contact area with the levers 90 thereby causing the polymeric member to experience less pressure upon any one given area. The main body 595 of the polymeric member is configured to provide an axial clearance 587 in the spring retainer to ensure proper positioning of the extreme end 91 of a lever. The spring retainer polymeric member 521 has a slot 531 to allow for easier installation within the peripheral groove 581 of the spring retainer 580.

Referring to FIGS. 10-15, a spring retainer 680 of an alternate preferred embodiment including an annular shaped polymeric member 621 is provided. The polymeric member 621 is typically fabricated from material identical or similar to that described for polymeric member 21. The spring retainer's 680 lower end has a lip 681. The lip 681 is adjacent a spring retainer peripheral groove having a first portion of a smaller diameter 683 portion and a second enlarged diameter portion 685. Between the first and second portion diameter portions is a tapered portion 687 that provides a lead in for assembly.

The annular shaped spring retainer polymeric member 621 has six generally hexagonal peripheral side edges 623 that match the six levers 90 of the clutch assembly. A diameter of an inner circular edge 625 of the spring polymeric member 621 is greater than a diameter of the peripheral groove second portion 685 or a diameter of the spring retainer lip 681 so that it may be installed over the lip 681 and be placed in position over the peripheral groove second portion 685. The spring retainer polymeric member has a main body portion 629 that is connected with three geometrically spaced stands 631. The stands 631 axially positioned the main body portion 629 adjacent the second portion of the peripheral groove 685 diameter to ensure an axial clearance 697 in a lower part of the peripheral groove. To retain the spring retainer polymeric member 621 to the spring retainer 680, there is provided a snap ring 635 that is fitted over the lip 681. The diameter of the inner edge 625 of the polymeric member is smaller than an outer diameter of the snap ring 635. Additionally, the diameter of the inner edge 625 of the polymeric member is slightly greater than a diameter of the peripheral groove to second portion 685 allow the polymeric member 621 to have a thermal radial clearance due to thermal expansion of the spring retainer 680 during operation of the clutch.

Figure 16:
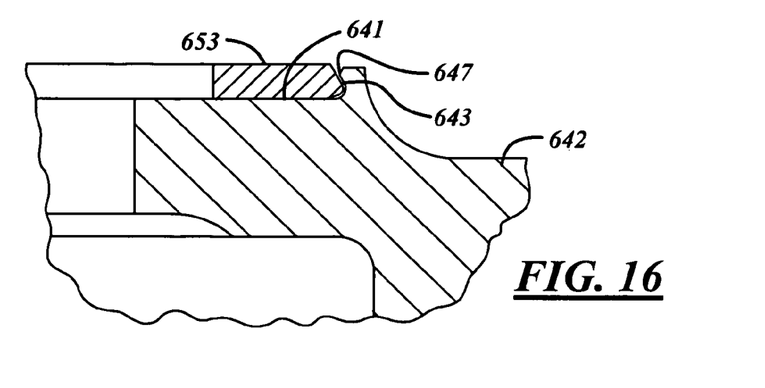
FIG. 16 is an enlarged partial sectional view of a pressure plate and pressure plate polymeric member of another alternate preferred embodiment clutch assembly according to the present invention.

Referring to FIG. 16 an annular pressure plate polymeric member 653 is presented. The pressure plate 642 has an annular groove 641 having along its outer diameter a radially compound tapered edge. The radially compound tapered edge has a first portion 643 (typically 30° from a line axially parallel) that receives and captures the pressure plate polymeric member 653 thereto. It also has a tapered edge 647 that aids in installation of the pressure plate polymeric member to the pressure plate 642. Polymeric member 653 has radial clearance (typically 0.007 to 0.017 inches) to allow for thermal radial expansion of the pressure plate during operation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selectively engagable dry friction clutch assembly for connecting a transmission with a flywheel of an engine comprising:
   a cover having a main body axially spaced from said flywheel and being torsionally connected thereto;
   an axially movable pressure plate torsionally connected with said cover;
   a friction disc for having torsional connection with an input shaft of a transmission, said friction disc being axially positioned between said flywheel and said pressure plate;
   a release assembly including a spring retainer biased by a coil spring for urging said pressure plate towards said flywheel, said coil spring being captured between said spring retainer and with respect to said cover; and
   a plurality of levers, each said lever having a radially inner first sliding pivot engagement with said spring retainer, an intermediate second sliding pivot engagement with said pressure plate, and a third pivot engagement with respect to said cover; and
   wherein at least one of said first and second sliding pivot engagements of said levers is on sliding surfaces provided by a polymeric member mounted on said respective spring retainer or on said pressure plate respectively.

2. A clutch assembly as described in claim 1 wherein said polymeric member is fabricated from at least one of a group of materials including PEEK™ (Polyetherether Ketone) and Vespel plastic.

3. A clutch assembly as described in claim 1 wherein for each lever there is a first polymeric member mounted on said spring retainer and a second polymeric member mounted on said pressure plate.

4. A clutch assembly as described in claim 1 wherein said polymeric member is press fit within a groove in said spring retainer.

5. A clutch assembly as described in claim 1 wherein said polymeric member is press fit within a groove of said pressure plate.

6. A clutch assembly as described in claim 1 wherein said polymeric member is annular shaped.

7. A clutch assembly as described in claim 6 wherein said polymeric member is mounted with a thermal radial clearance.

8. A clutch assembly as described in claim 1 wherein said pressure plate has an annular groove for receipt of said polymeric member and wherein said annular groove has a diameter radially tapered to capture said polymeric member.

9. A clutch assembly as described in claim 8 wherein said pressure plate annular groove diameter is compound radially tapered to aid in installation of said polymeric member.

10. A clutch assembly as described in claim 8 wherein said spring retainer has a rim having an outer first diameter greater than an inner diameter of said snap ring and wherein said spring retainer peripheral groove has a first portion with an inner diameter less than said inner diameter of said snap ring, and said spring retainer peripheral groove has a second portion with an inner diameter greater than an inner diameter of said snap ring, and wherein said polymeric member is annular shaped having an inner diameter greater than said inner diameter of said peripheral groove second portion and less than an outer diameter of said snap ring.

11. A clutch assembly as described in claim 10 wherein said spring retainer peripheral groove has a taper between said first and second peripheral groove portions.

12. A clutch assembly as described in claim 1 wherein said spring retainer has a peripheral groove and wherein there is a snap ring connected within said spring retainer peripheral groove to capture said polymeric member to said spring retainer.

13. A clutch assembly as described in claim 1 wherein said spring retainer has a peripheral groove and wherein a polymeric member positioned within said peripheral groove has a stand to axially position said polymeric member within said spring retainer peripheral groove.

14. A clutch assembly as described in claim 1 wherein said spring retainer has a peripheral groove and wherein said polymeric member is annular shaped with an inner circular shaped edge and an outer generally polygonal peripheral edge matched to a number of levers of said clutch assembly.

15. A clutch assembly as described in claim 1 further including a second friction disc for having torsional connection with an input shaft of said transmission, said second friction disc being separated from said first friction disc by an intermediate plate, said intermediate plate being torsionally connected with respect to said cover.

16. A selectively engageable dry friction clutch assembly for connecting a vehicle transmission with a flywheel of an engine comprising:
   a cover having a main body axially spaced from said flywheel and being torsionally connected thereto;
   an axially movable metallic pressure plate torsionally connected with said cover, said pressure plate mounting an annular shaped pressure plate polymeric member;

a friction disc for having torsional connection with an input shaft of a transmission, said friction disc being axially positioned between said flywheel and said pressure plate;

a release assembly including a spring retainer biased by a plurality of coiled springs for urging said pressure plate toward said flywheel, said coiled springs being captured between said spring retainer and said cover, said spring retainer having a peripheral groove with an annular shaped spring retainer polymeric member positioned therein; and at least three metallic levers, each said lever having a radially inner first sliding pivot engagement with said spring retainer polymeric member, an intermediate second sliding pivot engagement on said pressure plate polymeric member, and a third pivot engagement with respect to said cover.

17. A clutch assembly as described in claim 16 wherein adjacent an axial extreme end said spring retainer has a lip having a diameter greater than an outer diameter of said peripheral groove of said spring retainer and wherein a spring clip is installed within said spring retainer annular groove to axially constrain said spring retainer polymeric member.

18. A clutch assembly as described in claim 16 wherein said spring retainer polymeric member is axially positioned within said peripheral groove of said spring retainer to provide an axial clearance for said respective lever.

19. A clutch assembly as described in claim 16 wherein said pressure plate polymeric member and said spring retainer polymeric member are mounted having a thermal radial clearance.

20. A selectively engageable dry friction clutch assembly for connecting a truck vehicle transmission with a flywheel of an engine comprising:

a cover having a main body axially spaced from said flywheel and being torsionally connected thereto;

an axially movable metallic pressure plate assembly torsionally connected with said cover and having an annular groove;

an annular shaped pressure plate polymeric member mounted within said pressure plate annular groove having a thermal radial clearance therewith;

first and second friction discs for having torsional connection with an input shaft of a transmission, said friction discs being axially positioned between said flywheel and said pressure plate;

an axially movable intermediate plate juxtaposing said friction disc being torsionally connected with respect to said cover;

a release assembly including a spring retainer biased by a plurality of coil springs for urging said pressure plate toward said flywheel, said coil springs being captured between said spring retainer and said cover, said spring retainer having peripheral groove;

an annular shaped spring retainer polymeric member positioned within said spring retainer peripheral groove, said spring retainer polymeric member being mounted with a thermal radial clearance within said spring retainer groove and wherein said spring retainer polymeric member is axially positioned within said spring retainer peripheral groove to provide an axial clearance on a portion of said peripheral groove most adjacent to said pressure plate; and at least five metallic levers, each said lever having a radially inner first sliding pivoting engagement with said spring retainer polymeric member and having an extreme end extending within said axial clearance of said spring retainer annular groove, each said metallic lever having an intermediate second sliding pivot engagement on a surface provided by said pressure plate polymeric member, and each said lever having a third pivot engagement with respect to said cover.

* * * * *